No. 884,156. PATENTED APR. 7, 1908.
E. L. HITT.
ANIMAL CATCHING AND HOLDING TOOL.
APPLICATION FILED MAY 22, 1907.

2 SHEETS—SHEET 1.

WITNESSES:
Thos. W. Riley
E. F. Head.

INVENTOR
E. L. Hitt
By W. J. FitzGerald &Co
Attorneys

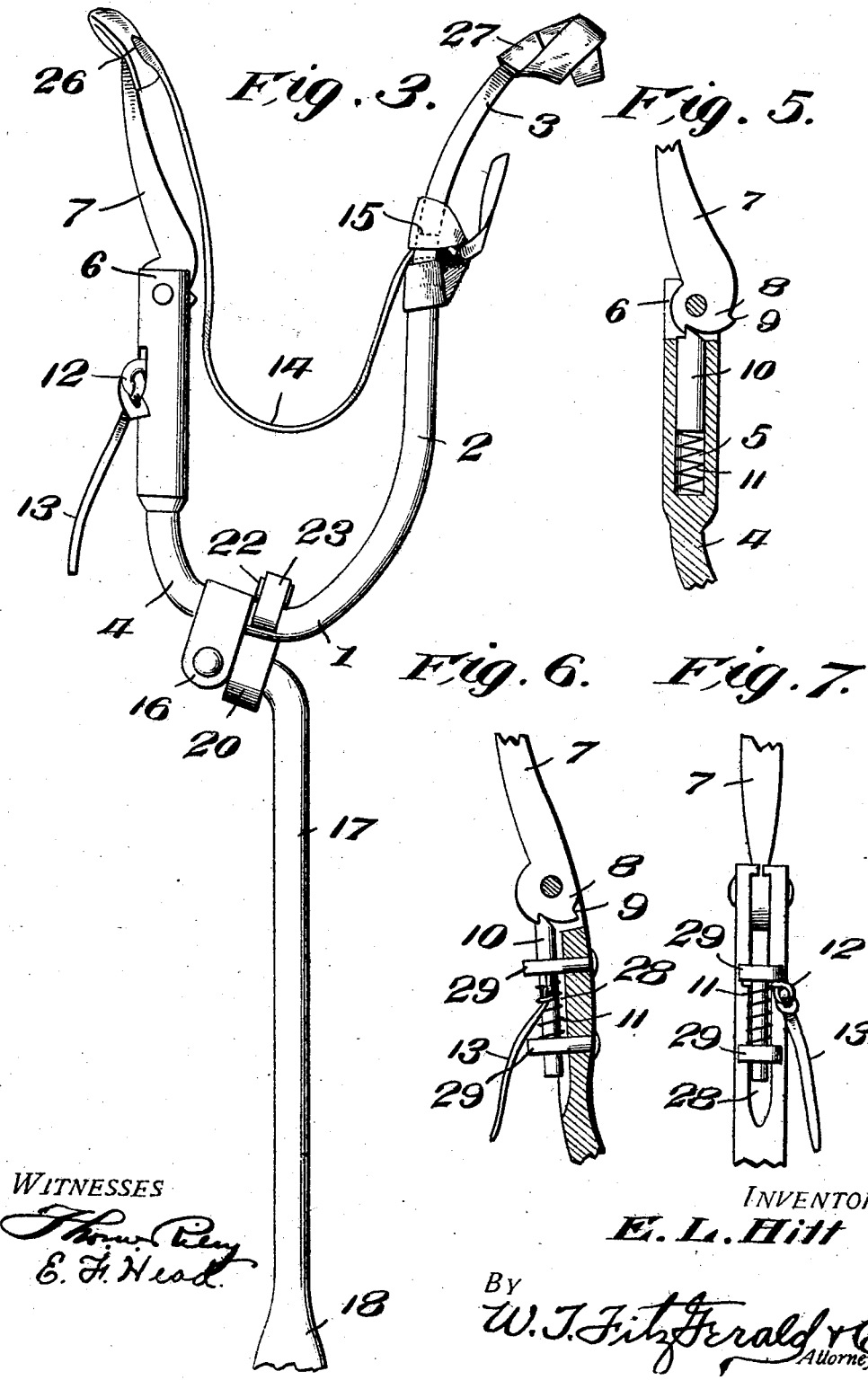

UNITED STATES PATENT OFFICE.

ELLET L. HITT, OF WEISER, IDAHO.

ANIMAL CATCHING AND HOLDING TOOL.

No. 884,156.      Specification of Letters Patent.      Patented April 7, 1908.

Application filed May 22, 1907. Serial No. 375,070.

*To all whom it may concern:*

Be it known that I, ELLET L. HITT, a citizen of the United States, residing at Weiser, in the county of Washington and State of Idaho, have invented certain new and useful Improvements in Animal Catching and Holding Tools; and I do hereby declare the following to be a full, clear, and exact description of the invention, such as will enable others skilled in the art to which it appertains to make and use the same.

My invention relates to new and useful improvements in animal catching and holding tools, and my object is to provide a device of this class whereby the same may be directed into engagement with a limb of an animal while the operator is at a distance from the animal.

A further object is to provide means for automatically closing portions of the tool, whereby the limb of an animal will be engaged.

A further object is to provide means for regulating the size or length of that portion of the tool engaging the animal.

A further object is to provide means for holding the parts of the tool in position when they are gripped around the limb of an animal.

A still further object is to provide means for adjustably securing the gripping portion of the tool whereby the tool may be set to engage the animal by thrusting the same forwardly or pulling the same rearwardly.

Other objects and advantages will be hereinafter referred to and more particularly pointed out in the claims.

Figure 2:
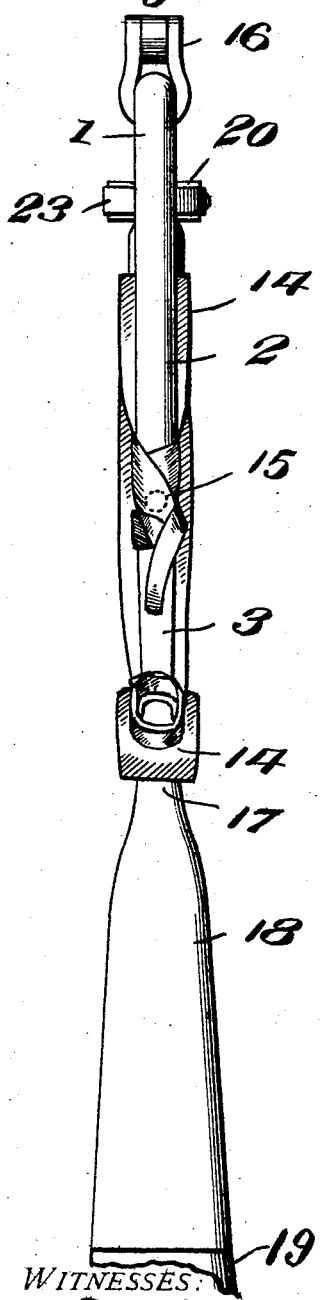
Figure 1:
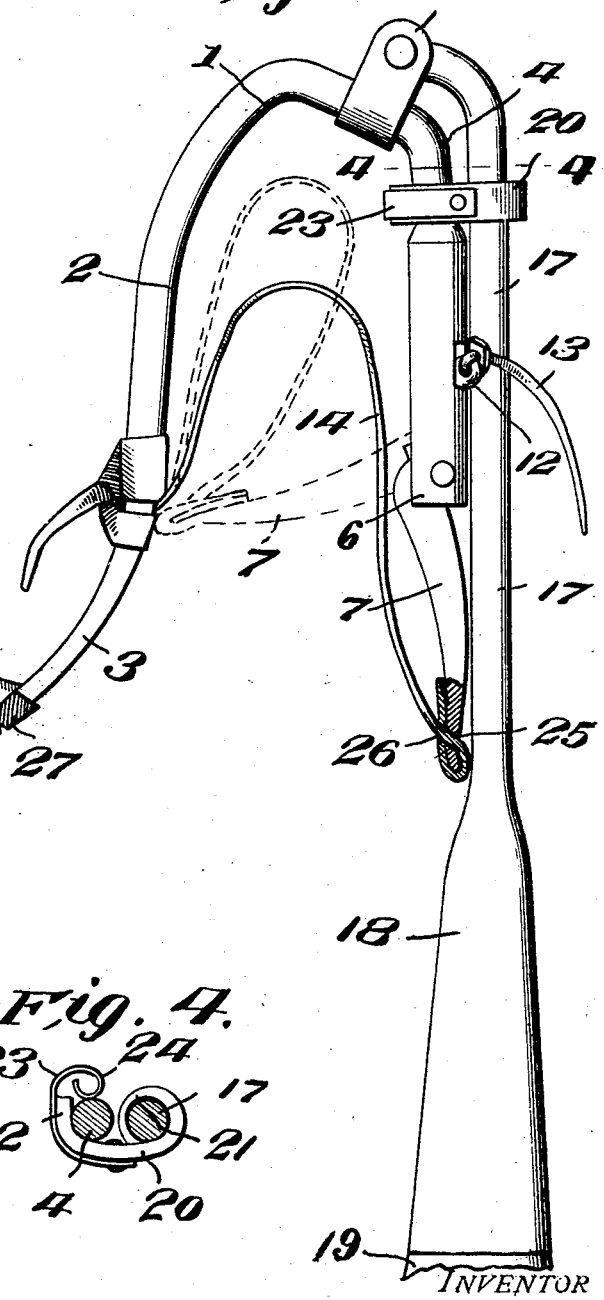
Figure 4:
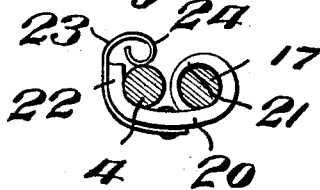

In the accompanying drawings, which are made a part of this application, Figure 1 is a side elevation of my improved animal catching and holding tool, showing the same in position to be moved rearwardly to engage an animal, the tool being shown in its closed position by dotted lines. Fig. 2 is an edge elevation thereof. Fig. 3 is a side elevation of the tool in position to be operated by receiving a forward thrust. Fig. 4 is a section view as seen on line 4—4, Fig. 1. Fig. 5 is a detail sectional view through portions of the device. Fig. 6 is a view similar to Fig. 5 showing a slightly modified form of construction, and, Fig. 7 is an edge elevation of that form of device shown in Fig. 6.

Referring to the drawings in which similar reference numerals designate corresponding parts throughout the several views, 1 indicates the body of my improved tool, which is preferably U-shaped, the arm 2 of the body 1 being provided at its outer end with an outwardly curved extension 3, while the arm 4 is of less length than the arm 2 and is tubular at its upper end to form a socket 5, the extreme upper end of the tubular portion being bifurcated to form ears 6 between which is pivotally secured one end of a lever 7, the arm 4 and lever 7, when in its extended position, being substantially the same length as the arm 2 and extension thereon.

That portion of the lever 7 between the ears 6 is provided with a head 8, the edge of which is provided with one or more notches 9, with which is adapted to engage a latch 10, said latch being in turn carried by the socket 5 formed at the end of the arm 4 and in order to normally hold the latch in engagement with the notched surface of the head 1, I dispose a tension spring 11 between the latch and bottom of the socket, thereby exerting outward pressure upon the latch at all times and normally holding the same in engagement with the notches.

The latch 10 has secured thereto an eye 12, which extends through a slot in one side of the socket 5, and has secured thereto a pull cord 13, so that when it is desired to release the latch from the notches, the same is accomplished by giving a downward pull upon the cord, thereby depressing the spring and moving the latch into the socket and out of engagement with the notches.

A strap 14 preferably of leather, is secured at one end to the free end of the lever 7, while the opposite end thereof is directed through an opening 15 in the arm 2, and the end of the strap is then wrapped around the arm 2 and secured thereon in any preferred manner, as by tying the same thereby extending the strap across the space between the arms 2 and 4 and it will be seen that when the leg or other part of an animal is passed between the arms 2 and 4, the strap will draw the lever 7 inwardly as the leg of the animal passes between the arms, thereby directing the lever in front of the leg while that portion of the strap 14 between the arms is formed into a loop as best shown by dotted lines in Fig. 1 of the drawing, and the lever is held in its inward position by the latch 10 engaging the notches 9 on the lever and by increasing or decreasing the length of the strap, which is accomplished by untying the end of the strap from the arm 2 and shortening or lengthening that portion of the strap between the arms 2, the size of the loop will be accordingly decreased or increased, thereby arranging the device for engaging various sized limbs and as the strap is soft and pliable, the flesh of the animal will not be injured when engaged by the loop.

For convenience of handling the catching and holding tool and to enable the operator to stand at a distance from the animal and operate the same, I secure to the body 1 a clip 16, between the ends of which is pivotally secured a shank 17, said shank having at its free end a socket 18, in which is secured a handle 19, and by providing the handle of the proper length, the operator can remain at a considerable distance from the animal while attaching the holder in position.

By thus pivoting the body 1 to the shank 17, it will be seen that the tool may be swung outwardly and extended beyond the end of the shank 17, so that a forward thrust will be required to direct the arms in engagement with the limb of an animal, or the same may be swung inwardly until it extends along the side of the shank, in which position it will require a rearward pull upon the handle to engage the tool with the limb of an animal, the operation of the parts being the same in either case, and in order to normally hold the tool in its adjusted position, I pivotally secure a keeper 20 to the shank 17 by bending one end of the keeper around the shank to form a loop 21, while the opposite end of the keeper 20 is bent at right angles to the longitudinal plane of the keeper, and is adapted to engage the body 1 when the tool is extended beyond the end of the shank, as shown in Fig. 3 of the drawings, and is adapted to engage the arm 4 when the tool is directed along the shank 17, as shown in Fig. 1 of the drawings, and in order to hold the end 22 in engagement with the parts engaged thereby, I secure to the keeper 20 a spring finger 23, the free end of which is extended beyond the end 22, and is curved inwardly to form a head 24, which, as best shown in Fig. 4, will positively engage the arm 4 and hold the end 22 in engagement therewith, and it will be clearly understood that by forming the finger of spring metal, the same will yield sufficiently to allow the head to pass by the arm when the keeper is being placed into or moved from engagement therewith.

The body 1 is rigidly secured to the clip 16 so that when the body 1 is in the position shown in Fig. 1 and the keeper 20 placed in engagement with the arm 4, said body will be held rigidly in adjusted position until the keeper 20 is disengaged. When it is desired to use the tool in the position shown in Fig. 3, the keeper 20 is disengaged and the clip 16 swung upon its pivot point. The keeper can then be moved on the shank 17 until the extension 22 engages the body 1.

In securing the end of the strap 14 to the lever 7, one end of the strap is preferably disposed over the upper end of the lever 7, and is directed through an opening 25 in the lever and through a slit 26 in the end of the strap, after which the strap is disposed through the bore 15 and secured around the arm 2, and it will be seen that the upper end of the lever will be cushioned while the extension 3 is provided with a covering 27 of leather, or like pliable material, which is secured to the extension in any preferred manner, and it will be seen that the metallic parts of the tool thus covered will be held out of direct contact with the parts of the animal engaged thereby.

In operation the size of the loop required to snugly fit the ankle or leg of the animal to be caught is determined and the strap 14 is properly adjusted between the arm 2 and the upper end of the lever 7 to form the required loop, when the lever 7 is opened or extended in line with the longitudinal plane of the arm 4, whereupon the operator approaches the animal and directs the arms 2 and 4 to each side of one leg of the animal, which will result in forcing the strap in the form of a loop and dispose the lever at right angles to the arm 4, thereby securely locking the strap around the leg of an animal, the latch 10 holding the lever in its adjusted position.

When it is desired to release the animal, a pull is given upon the cord 13, which will release the latch 10 from the notches 9, whereupon the lever 7 will swing to its normally open position and the animal be released, the cover 27 and strap 14 preventing any abrasions of the parts of the animal engaged.

In Figs. 6 and 7, instead of providing the arm 4 with a tubular end in which is formed the socket 5, I provide the outer face of the arm with a groove 28, in which is seated the latch 10, and the latch is secured in said groove by extending the same through eye-bolts 29, which are in turn secured to the arm 4 by extending the shanks of the eye-bolts through openings in the arm and upsetting the ends thereof. In this construction, the spring 11 is extended around the latch 10 and located between the eye 12 and the lower eye-bolt 29, so that outward pressure will be directed against the latch at all times and hold the same in engagement with the head 8.

It will thus be seen that I have provided a very cheap and durable device for catching and holding animals and one that can be quickly applied to use, and it will also be seen that by providing the parts of the device engaging the animal, of pliable material, such as leather, or the like, that the parts of the animal so engaged will not be lacerated or otherwise injured.

What I claim is:

1. In a device of the class described comprising a body having arms, one of said arms being longer than the other, a lever pivotally secured to the shorter arm and provided with a plurality of notches on the pivoted end of said lever, means on the shorter arm to engage one of the notches on said pivoted end and hold the lever in its inward position, a strap secured at one end to the free end of said lever and secured to the opposite arm whereby, when the strap is directed into engagement with an object, the lever will be rotated on its pivot point and a loop formed in the strap.

2. A device of the class described comprising a U-shaped body one arm being shorter than the other, a lever pivotally secured to the shorter of said arms and adapted to swing inwardly, the opposite arm having an opening therein a head on the pivoted end of said lever, said head having notches therein, means carried by the arm to engage said notches and hold the lever in its inward position, a strap secured at one end to the upper end of said lever, said strap being extended across the space between said arms and through the opening in the opposite arm and secured to said arm whereby when that portion of the strap between the arms is directed into engagement with an object, the lever will be drawn inwardly and a loop formed in the strap.

3. In a device of the class described, the combination with a U-shaped body one arm being shorter than the other, a lever pivotally secured to the shorter arm, means to hold said lever in its closed position, and a strap secured to said lever and extended across the space to the opposite arm, of a shank pivotally secured to said body, an operating handle secured to said shank and a keeper adapted to normally hold the body against movement.

4. The herein described catching and holding tool, comprising a body having arms extended therefrom, a lever pivotally secured to one of said arms, the opposite arm having an opening therein a strap disposed through the opening in said arm, and secured over the upper end of said lever, means to hold said lever in its closed position, a supporting shank for said body, means to pivotally secure the body to the shank, whereby said body may be adjusted to different positions, a keeper rotatably and movably mounted on said shank and means at the free end of said keeper adapted to engage the body and hold the same in its adjusted position.

5. In a catching and holding device, the combination with a body and means thereon to engage and hold an animal; of a shank, means to pivotally secure the body to the free end of said shank, a keeper pivotally and movably mounted on the shank, and a spring finger secured to the keeper and extended over the free end thereof adapted to engage parts of the body and hold the same in adjusted position.

In testimony whereof I have signed my name to this specification in the presence of two subscribing witnesses.

ELLET L. HITT.

Witnesses:
SOL BARNETT,
CHAS. ROCKLUVIN.